(12) United States Patent
Wu et al.

(10) Patent No.: US 7,568,856 B2
(45) Date of Patent: Aug. 4, 2009

(54) JOINT AND MAIN BEAM OF CONTAINER SEMI-TRAILER PROVIDED WITH THE JOINT

(75) Inventors: Zhuoan Wu, Guangdong (CN); Liangfu Xie, Guangdong (CN); Xiya Li, Guangdong (CN)

(73) Assignees: China International Marine Containers (Group) Co., Ltd., Guangdong (CN); CIMC Vehicles Group Co., Ltd., Guangdong (CN)

( * ) Notice: Subject to any disclaimer, the term of this patent is extended or adjusted under 35 U.S.C. 154(b) by 195 days.

(21) Appl. No.: 11/729,635

(22) Filed: Mar. 29, 2007

(65) Prior Publication Data

US 2007/0252348 A1 Nov. 1, 2007

(30) Foreign Application Priority Data

Apr. 29, 2006 (CN) .................. 2006 1 0011826

(51) Int. Cl.
*F16D 1/033* (2006.01)
(52) U.S. Cl. ...................... 403/377; 280/789; 52/838
(58) Field of Classification Search .............. 403/292, 403/335–337; 280/785, 786, 789; 52/837–839, 52/848, 849; 248/300; 256/65.15
See application file for complete search history.

(56) References Cited

U.S. PATENT DOCUMENTS

| | | | | |
|---|---|---|---|---|
| 2,046,152 A * | 6/1936 | Dean | ............................ | 52/301 |
| 3,442,542 A * | 5/1969 | Watanabe | ................... | 403/300 |
| 3,716,959 A * | 2/1973 | Bernardi | ...................... | 52/838 |
| 4,074,947 A * | 2/1978 | Matake et al. | ............... | 403/231 |
| 4,091,594 A * | 5/1978 | Yamashita | .................... | 52/838 |
| 4,095,912 A * | 6/1978 | Hagberg | ..................... | 403/187 |
| 4,211,400 A * | 7/1980 | Ray | ............................ | 472/116 |
| 6,073,405 A * | 6/2000 | Kasai et al. | ................... | 52/283 |
| 6,199,894 B1 * | 3/2001 | Anderson | ................... | 280/638 |
| 6,219,989 B1 * | 4/2001 | Tumura | ....................... | 52/838 |
| 6,648,391 B1 * | 11/2003 | Whiteford et al. | ........ | 296/26.08 |
| 6,681,538 B1 * | 1/2004 | Sarkisian | ..................... | 52/289 |
| 6,698,968 B2 * | 3/2004 | Kajiwara et al. | ............ | 403/337 |
| 6,857,808 B1 * | 2/2005 | Sugimoto et al. | ............. | 403/41 |
| 7,195,418 B2 * | 3/2007 | Durand et al. | ........... | 403/408.1 |
| 2004/0050013 A1 * | 3/2004 | Okada et al. | ............... | 52/726.2 |
| 2005/0144892 A1 * | 7/2005 | Strickland et al. | .......... | 52/729.1 |
| 2007/0209314 A1 * | 9/2007 | Vaughn | ..................... | 52/720.1 |

* cited by examiner

*Primary Examiner*—Daniel P Stodola
*Assistant Examiner*—Joshua T Kennedy
(74) *Attorney, Agent, or Firm*—Greer, Burns & Crain, Ltd.

(57) ABSTRACT

A joint and a main beam of a container semi-trailer provided with the joint. The joint includes a first connecting plate disposed on a connecting end of a first main beam of the container semi-trailer, wherein at least one side of the first connecting plate extends outwardly and forms a first extension, first connecting holes are disposed on the first connecting plate and the first extension; a second connecting plate is disposed on the connecting end of a second main beam of the container semi-trailer, wherein at least one side extends outwardly and forms a second extension, second connecting holes corresponding to the first connecting holes are disposed on the second connecting plate and the second extension; and fasteners are inserted into the first and second connecting holes and fastened to connect the connecting ends of the two main beams to form a complete main beam.

8 Claims, 3 Drawing Sheets

JOINT AND MAIN BEAM OF CONTAINER SEMI-TRAILER PROVIDED WITH THE JOINT

FIELD OF THE INVENTION

The present invention relates to a joint and a main beam of a container semi-trailer provided with the joint, and more particularly relates to a joint which is specially used to connect a main beam of a container semi-trailer with an extreme length for North America container transportation. Front and rear beams of the main beam are firmly assembled by using the joint to form a complete main beam.

BACKGROUND OF THE INVENTION

Shipping containers used in -inland America are typically 53 feet in length so that a semi-trailer for transporting the container should be greater than 53 feet. Semi-trailers are often made in China and then transported to United States by ship. There are two methods for shipping. The first method is to use bulk cargo ships and the second method is to use container vessels. By using bulk cargo ships, the semi-trailer can be transported integrally. However, using the first method occupies large space and freight is high. Additionally, the shipping frequency of the bulk cargo ship is too low to meet delivery requirements. With the second method, although the shipping frequency of the container vessels is high and the freight is low, there are limitations on the goods with extreme length because the length of the standard container is 20 feet or 40 feet. Therefore, for shipping the semi-trailer of 53' by using the standard container vessels, the semi-trailer is segmented into two or more parts. The semi-trailer is transported in parts by the containers and assembled after arriving at United States to form an integrated 53' container semi-trailer.

FIG. 1A illustrates a connected two-segment main beam of a containers semi-trailer of 53'. Because the main beam of container semi-trailer is too long to transport, it is segmented into two parts, i.e. a front beam 10 and a rear beam 20, or more parts. After reaching the destination, the front beam 10 and the rear beam 20 are assembled by a joint 30 to form the complete main beam of a 53' container semi-trailer.

FIG. 1B illustrates the structure of a disconnected conventional joint for connecting the main beam of container semi-trailers. The main beam of container semi-trailer is in the form of I-shaped steel. The conventional joint 30 comprises a first connecting plate 31 welded on the cross section of an connecting end 11 of the front beam 10, and a second connecting plate 32 welded on the cross section of an connecting end 21 of the rear beam 20. Two ribs 331, and 332 spaced apart in an upright direction, are provided at an inner side of the connecting plates 31 and 32 to prevent the connecting plates 31 and 32 from deforming when connected by the bolts.

FIG. 1C illustrates a connected conventional joint. When connecting, the joint of the front beam 10 and the rear beam 20 are aligned with each other, and the connecting plates 31 and 32 are closed up with each other. Afterwards, as shown in FIGS. 1D and 1E, six bolts 33 are inserted into six bolt holes 311 and 321 and tightened by a fastening tool to form a complete main beam. It can be seen from the drawings that in this structure, the bolts bear all the forces transferred to the connecting plate when the container semi-trailer is running.

In the prior art, the main beam is segmented into several parts to meet the requirements of transporting, and after reaching the destination joints are used to reassemble the main beam. The conventional joint mentioned above comprises a connecting plate welded on the cross section of an end of the main beam, and three pairs of bolts are used to fix said joints to form a complete main beam structure. Although this is a simple and practical connecting method, during running of the container semi-trailer, the main beam is often in situations of being stretched, bent, twisted, or sheared etc. alternately. The top and the bottom pair of bolts have the biggest stress, which may cause one or two of the bolts bear very large force which may even exceeding the yield limit of the bolt. As a result, the bolts are deformed or destroyed thus cause the connection failure.

Generally, it is urgent to develop a more reliable joint and main beam of container semi-trailer for segmented container semi-trailer with an extreme length.

SUMMARY OF THE INVENTION

The main object of the present invention is to provide a joint and a main beam of a container semi-trailer provided with the joint to solve the problem that a conventional main beam has high stress on connecting bolts and connecting plates have a low rigidity, to achieve an effective and reliable connection for the segmented main beam without increasing cost and technical difficulty by slightly changing the structure, and to improve stress condition of the bolts and to prolong the service life of the bolts. Said joint and said main beam of a container semi-trailer provided with the joint can be quickly and conveniently assembled to form a container semi-trailer which can be transported using containers of various sizes.

To achieve the object, the present invention provides a joint for connecting a first main beam and a second main beam of container semi-trailer, characterized in that the joint comprises a first connecting plate disposed on a connecting end of the first main beam of container semi-trailer, wherein at least one side of said first connecting plate extends outwardly and form a first extension, a first connecting holes are disposed on the first connecting plate and said first extension; a second connecting plate disposed on the connecting end of the second main beam of container semi-trailer, wherein at least one side extends outwardly and form a second extension, a second connecting holes corresponding to said first connecting holes are disposed on the second connecting plate and said second extension; and fasteners, which are inserted into said first and second connecting holes and fastened to connect said connecting ends of said first and second main beam of container semi-trailers, thereby form a complete main beam.

The joint further comprises a first web connected to the first extension of the first connecting plate and the side beam disposed on one side of connecting end of said first main beam of container semi-trailer; and a second web connected to the second extension of the second connecting plate and the side beam disposed on one side of connecting end of said second main beam of container semi-trailer.

The joint further comprises: a first flange disposed along an outer side edge of the first web, wherein two ends of said first flange are connected to the first extension and the side beam of the first main beam of container semi-trailer; and a second flange disposed along an outer side edge of the second web, wherein two ends of said first flange are connected to the second extension and the side beam of the second main beam of container semi-trailer.

The joint according to the present invention, wherein said first connecting plate, said first web and said first flange define a closed box-like frame, and the second connecting plate, the second web and the second flange also define a closed box-like frame.

The joint according to the present invention, wherein both of the first extension and the second extension are 75-100 cm in length.

The joint according to the present invention, wherein ribs are disposed between the first connecting plate and the first main beam of container semi-trailer, and between the second connecting plate and the second main beam of container semi-trailer respectively.

The joint according to the present invention, wherein eight of said fasteners are arranged in two rows.

To achieve the object, the present invention further provides a main beam provided with a joint, wherein said main beam can be used for a container semi-trailer, characterized in that the main beam is composed of multiple main beams connected by the joints which connect the connecting ends of two adjacent main beams, the joint comprising: a first connecting plate disposed at a first connecting end of the first main beam, wherein at least one side of said first connecting plate extends outwardly and form a first extension, and a first connecting hole is disposed on said first extension and said first connecting plate; a second connecting plate disposed at a second connecting end of the second main beam, wherein at least one side of first connecting plate extends outwardly and form a second extension, and a second connecting hole corresponding to said first connecting holes is disposed on said second extension and said second connecting plate; and fasteners, which are inserted into said first and second connecting holes and fastened to connect said connecting ends of said two main beams of container semi-trailer, thereby form a complete main beam of container semi-trailer.

The main beam of container semi-trailer provided with the joint characterized in that the joint further comprises a first web connected to the first extension of the first connecting plate and the side beam disposed on one side of connecting end of said first main beam; and a second web connected to the second extension of the second connecting plate and the side beam disposed on one side of connecting end of said second main beam.

The main beam of container semi-trailer provided with the joint characterized in that the joint further comprises: a first flange disposed along an outer side edge of the first web, wherein two ends of said first flange are connected to the first extension and the side beam of the first main beam; and a second flange disposed along an outer side edge of the second web, wherein two ends of said first flange are connected to the second extension and the side beam of the second main beam.

The main beam of container semi-trailer provided with the joint characterized in that, said first connecting plate, said first web and said first flange define a closed box-like frame, and the second connecting plate, the second web and the second flange also define a closed box-like frame.

The main beam of container semi-trailer provided with the joint characterized in that, both of the first extension and the second extension are 75~100 cm in length.

The main beam of container semi-trailer provided with the joint characterized in that, ribs are disposed between the first connecting plate and the first main beam, and between the second connecting plate and the second main beam respectively.

The main beam of container semi-trailer provided with the joint characterized in that eight of said fasteners are arranged in two rows.

According to one aspect of the present invention, the connecting plates of conventional joint are extended to form extensions, and the number of bolts is increased from 6 to 8 thus the alternate force exerted on the joint are beard by said 8 bolts, and a box-like frame is weld onto said extension, therefore higher strength and rigidity of connecting plate are achieved, also the reliability of connection and the service life are increased by improving stress situation of bolts and reducing shearing stress and bending stress in the bolt.

According to another respect of the present invention, the present invention overcome the disadvantages of top and bottom groups of bolts bearing greater forces than other groups, thus decreases the possibility of loosen or damage of the bolts cause by the alternate forces, and increases the reliability and the anti-fatigue performance of the bolt connection.

The present invention will be described in detail with reference to the accompanying drawings and preferred embodiment. It should be understood that the following description should not be considered as a limitation on the present invention.

BRIEF DESCRIPTION OF THE DRAWINGS

FIG. 1D is a front view of the conventional joints shown in FIG. 1C connected through bolts;

FIG. 1E is a sectional view of the cross section of a connecting plate disposed on the front beam shown in FIG. 1D;

DETAILED DESCRIPTION OF PREFERRED EMBODIMENTS

Figure 1A:
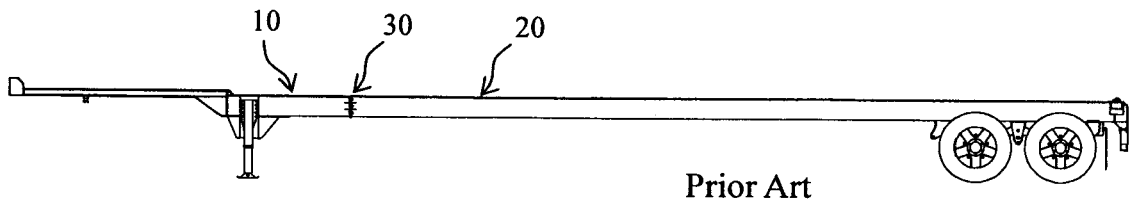
FIG. 1A is a schematic view of a container semi-trailer provided with conventional joint illustrating that two main beams of container semi-trailer connected by the conventional joint.
Figure 1B:
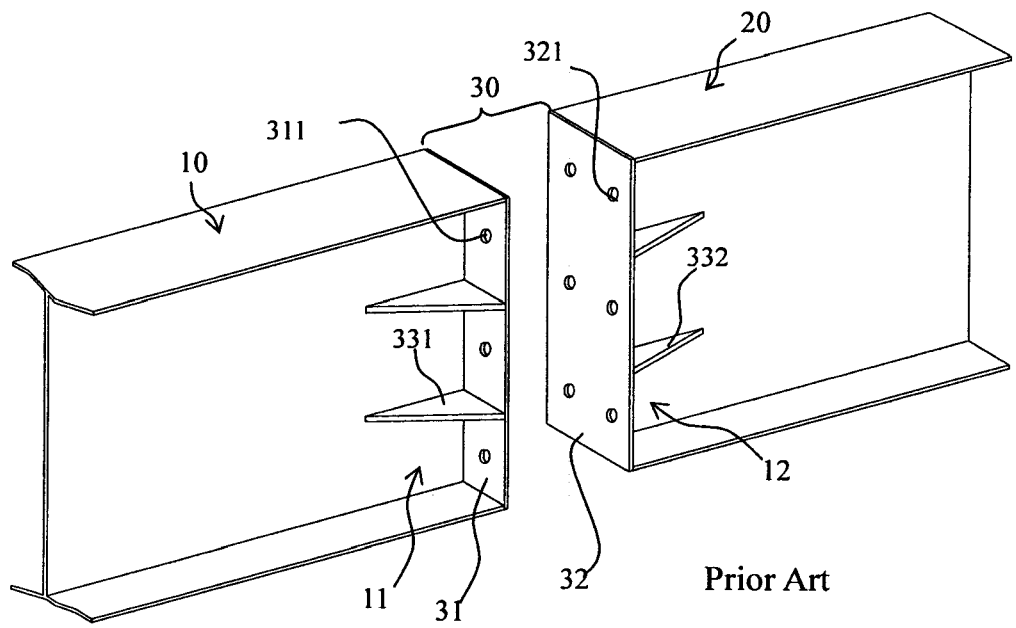
FIG. 1B is a schematic 3D view of two disconnected conventional joints shown in FIG. 1A.
Figure 1C:
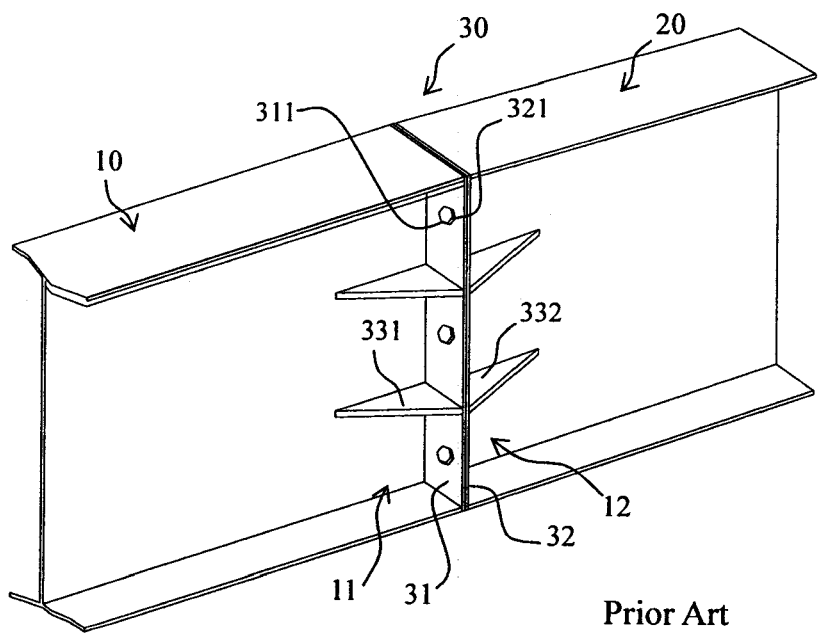
FIG. 1C is a schematic 3D view of two aligned conventional joints shown in FIG. 1B.

A preferred embodiment of the structure of the joint according to the present invention is shown in FIGS. 2A~2D. In the preferred embodiment, a connection between a first main beam 10 of container semi-trailer and a second main beam 20 of container semi-trailer is illustrated as an example. However, it should be understood that the joint 30 of the present invention can be used for connecting multiple segments of main beams of a container semi-trailer.

In the present invention, the joint 30 comprises a first connecting plate 31 welded on a connecting end 11 of a first main beam 10 and a second connecting plate 32 welded on a connecting end 12 of a second main beam 20. Two first ribs 331 and two second ribs 332 are disposed on the inner side of the first connecting plate 31 and the second connecting plate respectively to prevent said connecting plates 31 and 32 from deforming after connected using bolts 33. The first and second connecting plates 31 and 32 extend downwardly and form a first extension 312 and a second extension 322. A first flange 314 and a first web 316 are welded on the outer side of the bottom flange 16 of the first main beam 10, and a second flange 324 and a second web 326 are welded on the outer side of the bottom flange 26 of the second main beam 20. The first and second extensions 312 and 322, the first and second flanges 314 and 324, and the first and second webs 316 and 326 define two closed box-like structure respectively to improve the rigidity and strength of the connecting plates and decrease the stress on the bolts. Eight bolts are inserted into 8 bolt holes and tightened by a tool to assemble the main beams.

Figure 2A:
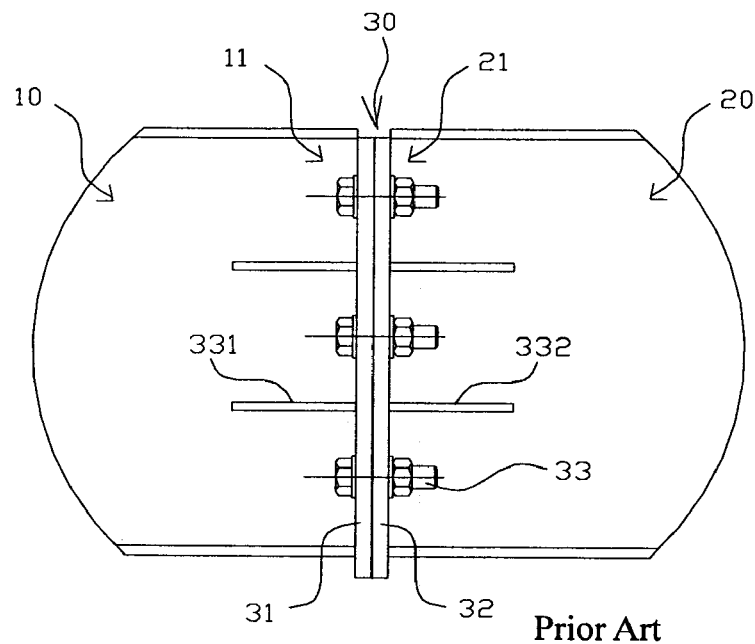
FIG. 2A is a 3D view of disconnected joints according to the present invention.
Figure 2A:
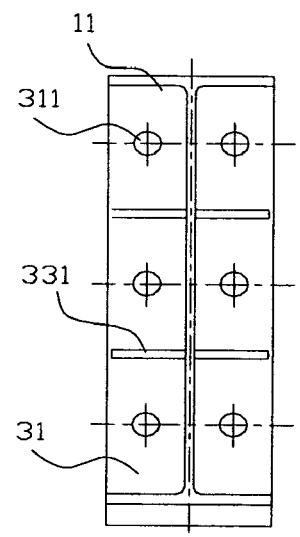
Figure 2A:
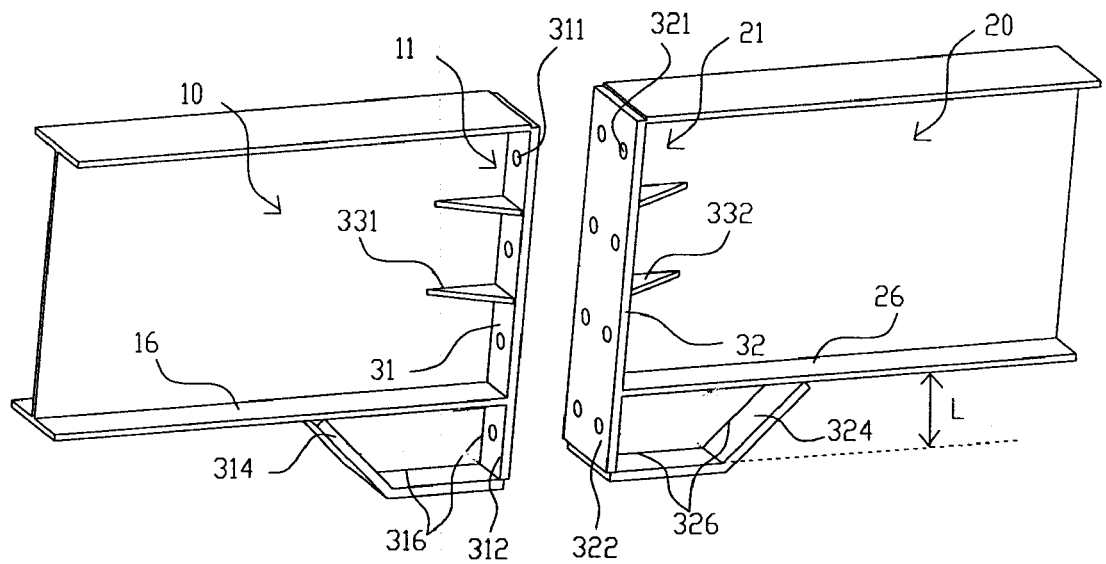

Specially, as shown in FIG. 2A, the first connecting plate 31 is mounted on the connecting end 11 of the first main beam 10, said connecting plate 31 extends downwardly to form a first extension 312 with a preferred length of 75~100 cm. First connecting holes 311 are disposed on the first connecting plate 31 and the first extension 312 for bolt connection. Preferably, a first web 316 is disposed on an outer side of the bottom flange 16 and connected to the first extension 312 and the bottom flange 16. A first flange 314 is disposed on the outer side of the first web 316 and connected to the first extension 312 and the bottom flange 16. Said first flange 314, the first web 316 and the first extension 312 define a closed box-like structure.

As shown in FIG. 2A, the second connecting plate 32 is mounted on the connecting end 21 of the second main beam 20, said connecting plate 32 extends downwardly to form a second extension 322 corresponding to said first extension 312 with a preferred length of 75~100 cm. Second connecting holes 321 corresponding to first connecting holes 311 are disposed on the second connecting plate 32 and the second extension 322 for bolt connection. Preferably, a second web 326 is disposed on an outer side of the bottom flange 26 and connected to the second extension 322 and the bottom flange 26. A second flange 324 is disposed on the outer side of the second web 326 and connected to the second extension 322 and the bottom flange 26. Said second flange 324, the second web 326 and the second extension 322 define a closed box-like structure.

Figure 2B:
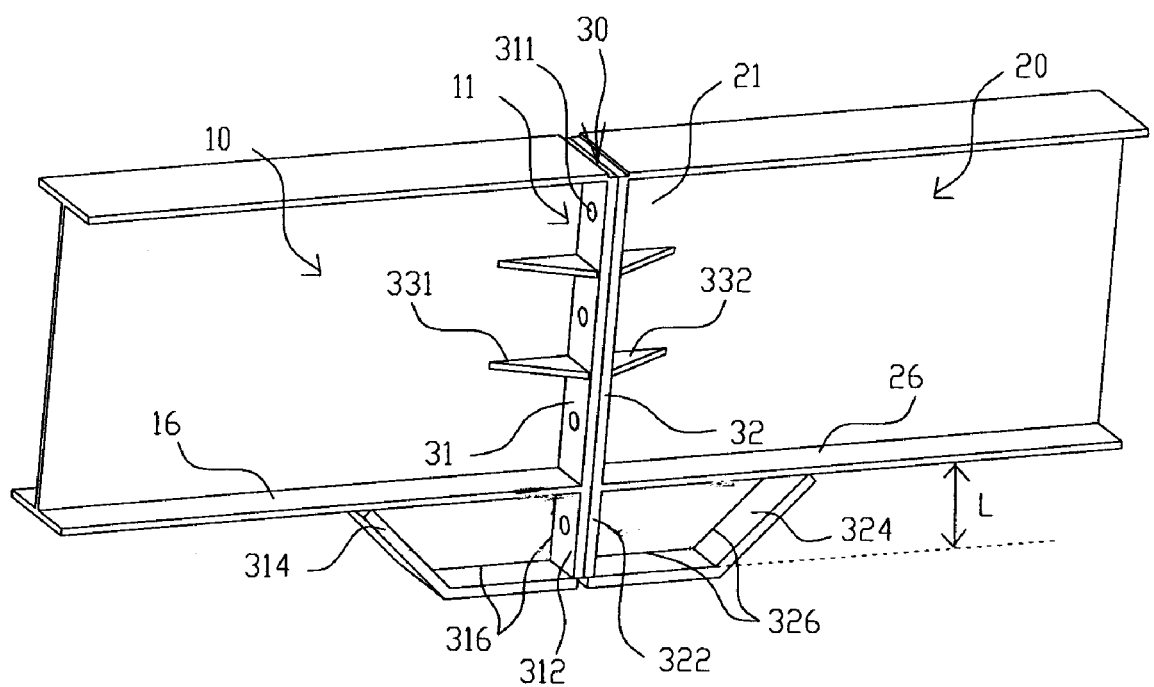
FIG. 2B is a schematic view of the aligned joints of the present invention.
Figure 2C:
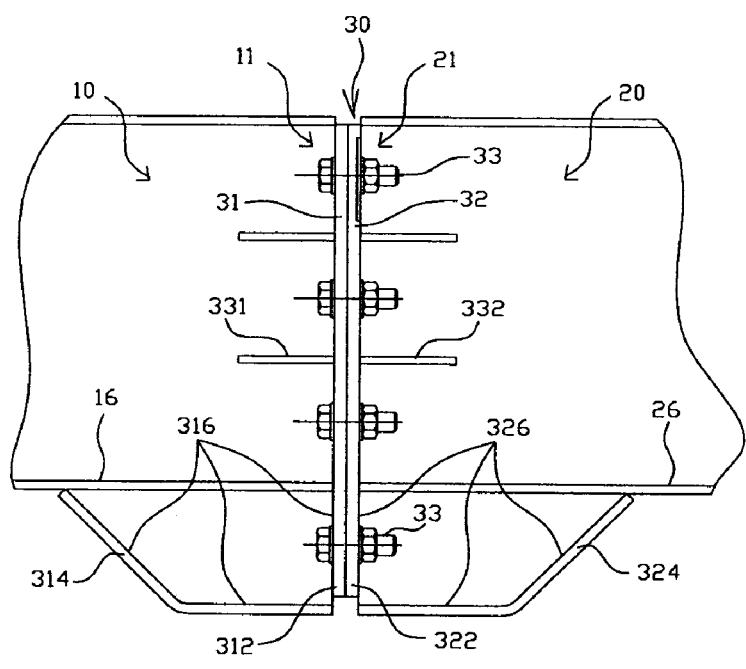
FIG. 2C is a front view of the joints of the present invention connected through the bolts.
Figure 2D:
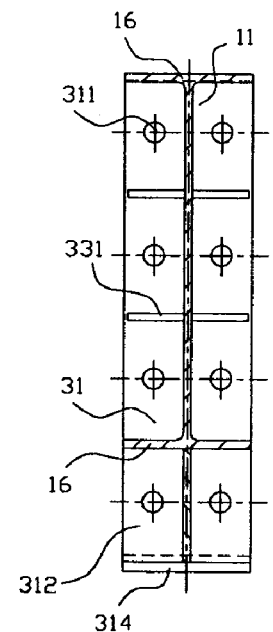
FIG. 2D is a sectional view of the cross section of the first beam provided with a first connecting plate and a first flange.

As shown in FIG. 2B, when connecting, the first connecting end 11 of the first main beam 10 is aligned with the second connecting end 21 of the second main beam 20, and the two connecting plates 31 and 32 are closed up. As shown in FIGS. 2C and 2D, eight bolts 33 (or other fasteners) are inserted into the first connecting holes 311 and the second connecting holes 321 respectively and tightened by a fastening tool. Therefore, the connecting ends of the main beams of container semi-trailers are connected to form an complete main beam. In this preferred embodiment, connection by eight bolts arranged in two rows is illustrated.

Because the joint is provided with one more pair of holes, the stress on the bolts is improved, and alternate forces on the joint are borne by the eight bolts. The box-like structures are welded on the extensions to ensure high rigidity and strength of the connecting plate, decrease shearing and bending stress of the bolts, and increase the service life and the reliability of the connection.

Furthermore, the main beams connected by using the joint of the present invention are suitable for container semi-trailers; said main beam of container semi-trailer is composed of multi-segments connected by the joint, therefore main beam of container semi-trailers with different dimension can be obtained by using the joint of the present invention. The connected structures are similar to that as shown in FIG. 1A.

While the invention has been described in conjunction with the specific embodiments described above, it is evident that many alternatives, modifications and variations are apparent to those skilled in the art. Accordingly, the preferred embodiments of the invention as set forth above are intended to be illustrative and not limiting. Various changes can be made without departing from the spirit and scope of the invention.

What is claimed is:

1. A joint for connecting a first main beam of a container semi-trailer and a second main beam of the container semi-trailer, wherein the joint comprises:
    a first connecting plate disposed on a connecting end of the first main beam of the container semi-trailer, wherein at least a lower side of said first connecting plate extends outwardly and forms a first extension, a first plurality of connecting holes are disposed on said first connecting plate and said first extension;
    a first web connected to said first extension of said first connecting plate and a first side beam that is disposed on said lower side of the connecting end of the first main beam of the container semi-trailer;
    a first flange disposed along an outer side edge of said first web, wherein two ends of said first flange are respectively connected to said first extension and the first side beam;
    a second connecting plate disposed on the connecting end of the second main beam of the container semi-trailer, wherein at least said lower side extends outwardly and forms a second extension, a second plurality of connecting holes corresponding to said first connecting holes are disposed on said second connecting plate and said second extension;
    a second web connected to said second extension of said second connecting plate and a second side beam that is disposed on the lower side of the connecting end of the second main beam of the container semi-trailer;
    a second flange disposed along an outer side edge of said second web, wherein two ends of said second flange are respectively connected to said second extension and the second side beam; and
    fasteners, each of which are inserted into corresponding said first and second connecting holes and fastened to directly connect the connecting ends of the two main beams of the container semi-trailer, thereby form a complete main beam of the container semi-trailer,
    wherein said the first connecting plate, said first flange and said first web are configured such that said first web is enclosed at its whole perimeter by said first extension of said first connecting plate, said first flange and the first side beam together, so as to form a closed box-shaped frame, and
    wherein said second connecting plate, the second flange and said second web are configured that said second web is enclosed at its whole perimeter by said second extension of said second connecting plate, said second flange and the second side beam together, so as to form another closed box-shaped frame.

2. The joint according to claim 1, wherein both of said first extension and said second extension are 75~100 cm in length.

3. The joint according to claim 1, wherein ribs are disposed between said first connecting plate and the first main beam of the container semi-trailer, and between said second connecting plate and the second main beam of the container semi-trailer respectively.

4. The joint according to claim 1, wherein eight of said fasteners are arranged in two rows.

5. A main beam of a container semi-trailer provided with a joint, wherein the main beam of the container semi-trailer is composed of main beams connected by the joints, said joints connect the connecting ends of two adjacent main beams, the combination comprising:
    a first connecting plate disposed at a first connecting end of the first main beam of the container semi-trailer, wherein at least a lower side of said first connecting plate extends outwardly and forms a first extension, and a first connecting hole is disposed on said first extension and said first connecting plate;

a first web connected to the first extension of the first connecting plate and a first side beam that is disposed on the lower side of connecting end of said first main beam of container semi-trailer; and a first flange disposed along an outer side edge of the first web, wherein two ends of said first flange are respectively connected to the first extension and the first side beam;

a second connecting plate disposed at a second connecting end of the second main beam of the container semi-trailer, wherein at least a lower side of said first connecting plate extends outwardly and form a second extension, and a second connecting hole corresponding to said first connecting hole is disposed on said second extension and said second connecting plate;

a second web connected to the second extension of the second connecting plate and a second side beam that is disposed on the lower side of connecting end of said second main beam of container semi-trailer;

a second flange disposed along an outer side edge of the second web, wherein two ends of the second flange are respectively connected to the second extension and the second side beam; and fasteners, each of which are inserted into corresponding said first and second connecting holes and fastened to directly connect said connecting ends of said two main beams of container semi-trailer, thereby form a complete main beam of container semi-trailer, wherein the first connecting plate, the first flange and the first web are configured such that the first web is enclosed at its whole perimeter by the first connecting plate, the first flange and the first side beam together, so as to form a closed box-shaped frame, and wherein the second connecting plate, the second flange and the second web are configured that the second web is enclosed at its whole perimeter by the second connecting plate, the second flange and the second side beam together, so as to form another closed box-shaped frame.

6. The main beam of container semi-trailer according to claim 5, wherein both of the first extension and the second extension are 75~100 cm in length.

7. The beam according to claim 5, wherein ribs are disposed between the first connecting plate and the first main beam of container semi-trailer, and between the second connecting plate and the second main beam of container semi-trailer respectively.

8. The joint according to claim 5, wherein eight of said fasteners are arranged in two rows.

* * * * *